Jan. 9, 1934.  P. B. ANDREWS  1,942,468
FLEXIBLE INSULATED PIPE
Filed Oct. 28, 1931
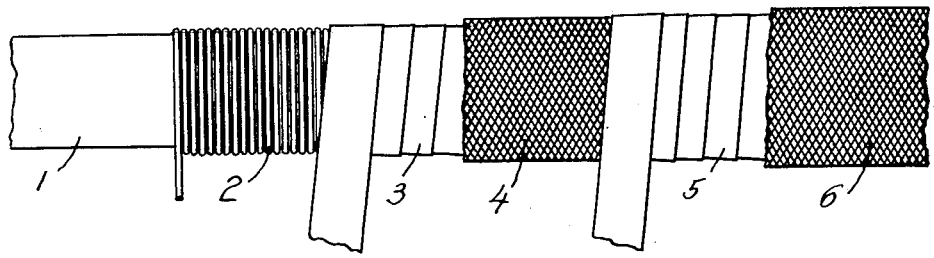
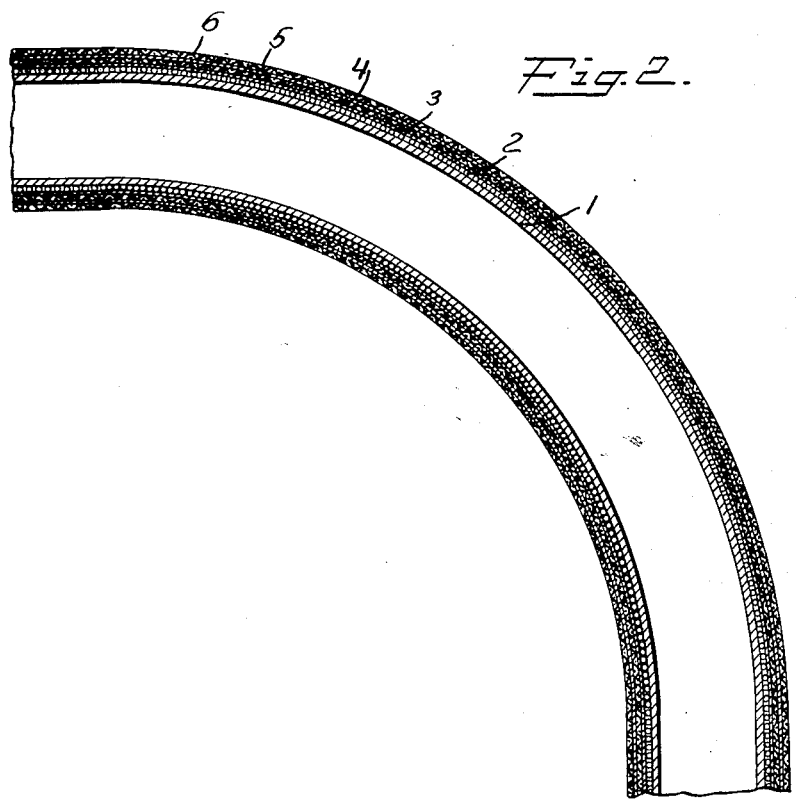
INVENTOR
Paul B. Andrews
BY
ATTORNEYS Patented Jan. 9, 1934

1,942,468

UNITED STATES PATENT OFFICE 1,942,468

FLEXIBLE INSULATED PIPE

Paul B. Andrews, Rome, N. Y., assignor to Revere, Copper & Brass Incorporated, a corporation of Maryland Application October 28, 1931. Serial No. 571,591

6 Claims. (Cl. 154—44)

This invention relates to a flexible, insulated metal pipe and has for an object the provision of an improved fluid conducting pipe and thermal insulation therefor. More particularly, the invention contemplates the provision of a flexible unit pipe and thermal insulation adapted for use in various kinds of fluid conducting pipe systems.

Under the customary present conditions, difficulties are experienced in properly and quickly installing certain sections of insulated pipe systems. It frequently happens, in the installation of such pipe systems as are used for heating or cooling, that special and costly fittings are required for certain inaccessible places. After the pipe and fittings have been installed in such inaccessible places, more difficulty is encountered in properly applying insulation. Insulation is very poorly applied on certain places of pipe lines due to the difficulty workmen have in gaining access to pipe run through walls, partitions, double floors, etc. In many instances it is necessary to remove floors or walls to properly apply the insulation of present use. The application of insulation to curved pipes is made by either cutting and fitting pieces of insulating material or, by compressing or stretching the insulation to such extent that the insulating value is lessened. The kind of insulation customarily applied to pipes that are subjected to vibration from connected machinery is most unsatisfactory, as it frequently becomes loosened and separates from the pipe.

The present invention contemplates the substantial elimination of many of the difficulties encountered in installing pipe and the thermal insulation thereon. The flexible insulated unit pipe of the invention may be quickly and easily bent to the form required for carrying an insulated pipe system through such inaccessible places as walls, floors and around machinery installed in close quarters. The use of fittings for bends, off-sets and changes in direction of the pipe line are materially obviated. The insulation which is permanently formed about the pipe is of a flexible nature and conforms to whichever form the pipe within is made to assume. Due to the particular manner in which the insulation is applied, the effective insulating value at the zone of a bend is not materially changed by the deformation and compression of bending.

The invention has for an object a pipe covered with a composite thermal insulation and support therefor. The invention aims to provide a flexible pipe having formed thereon a heat resisting insulation which is adaptable to conform to the pipe when straight or when bent and to maintain a substantially uniform resistance to the flow of heat. The insulation of the invention contains air cells and air spaces which are not materially deformed by the bending of the pipe. The invention further contemplates the provision of a thin walled flexible metal tube provided with helically wound tape for increasing the tensile strength of the tube.

The invention will be better understood from a consideration of the following description in conjunction with the accompanying drawing in which is shown one embodiment of the invention, and in which Fig. 1 is a view of a pipe section with portions of the various insulating layers thereon removed; and Fig. 2 is a sectional elevation of pipe and insulation thereon in bent form.

The drawing shows a metal pipe 1 which is preferably composed of steel, brass, or copper of the seamless type. Where flexibility is required the pipe is composed preferably of annealed copper or other soft metal. The pipe is capable of withstanding relatively high internal pressures such as result when liquids or gases are conveyed therethrough under pressure. A cord 2 composed of thermal insulating material, such for example, as an asbestos cord, is wrapped around the pipe surface to form a uniform covering thereon with uniform air spaces between the turns of the cord. A tape 3 is next helically wound over the cord in such manner that portions of each turn overlaps the next preceding turn to form a telescopic covering. The tape may serve either as an insulating and supporting medium or as a supporting medium depending upon the material of which the tape is composed.

An insulating cord is next woven into a fabric 4 which is fitted closely around the tape 3. The woven fabric is flexible and will bend with the pipe and at the same time firmly support the underlying layers of thermal insulation.

An additional layer of helically wound tape 5 is applied so that each turn of the tape overlaps the preceding turn to form a telescopic, helical covering over the woven fabric 4. A second layer of fabric 6 of thermal insulating cord is either woven to fit snugly over the preceding layer of tape 5 or, fabric is wrapped thereover. A multiplicity of the various groups of layers of insulating materials may be made to insure the degree of insulation required.

In the use of the thermally insulated flexible pipe of the invention, the pipe may be bent into a curve or coiled without materially disturbing the uniformity of insulating value of the various insulating and supporting layers previously described. The various turns of cord 2 which make up the inner layer of insulation, will be brought into closer relation to each other on the inner or short side of a bend, while the cords on the long side will be spaced further apart. The air cells within the cord are not rendered ineffective by a compression of the cell walls. The air spaces between the turns of the cord are changed in shape when the pipe is bent but not to such extent as to impair the insulating value of the air spaces. The stretching and compressing forces which may result from a normal bending of the pipe are confined solely to the air spaces between the cords and the compression or concentration of the cords, on the short side of a bend, is within the air spaces and the air cells within the cord are thus not destroyed. In Fig. 2 the relative positions of the cord, are shown when the pipe is bent into a curve. There is sufficient flexibility because of the spacing provided to prevent crushing of the cords. The air spaces between the layers of insulating materials, though somewhat changed in form due to the bending of the pipe, are not materially lessened in insulating value because of the manner in which the overlaying or interposed layer of tape is applied.

The helically wound layer of tape acts in telescopic fashion when the pipe is bent in such manner that the thermal insulating value thereof is not changed. The layer of tape is so applied as to permit expansion and contraction within itself, and also permits each adjacent layer of air space and insulation to contract or expand without lessening the thermal insulating value. In other words, this tape will serve as a sliding bearing over or under which each layer can assume changing positions without changing its functional relations to the other layer. The woven thermal insulating fabric firmly holds the previously applied insulating layers and prevents any loosening or slipping of the inner layers.

The invention provides a flexible, thermally insulated conduit composed of a combination of metallic tubing and a plurality of both laterally and longitudinally wrapped or woven insulating material or both, in which is formed uniformly divided air spaces. The insulation is so applied that when the pipe is bent or flexed, each layer of insulating material will contract or expand sufficiently to compensate for the increased area on the outside of the bent portion, without destroying the air spaces or their relative positions within the layers. Each air space contracts or expands with the elongation or contraction of the dividing insulating material.

The term "insulation" as used throughout this specification and in the claims refers to thermal insulation, that is, a material offering resistance to the flow of heat. The term "air cells" refers to the cells within the insulating material itself and the term "air spaces" refers to those air spaces which have been formed within each layer and to the spaces between the separate layers.

The helically wound tape may be composed of various kinds of materials. Where a high degree of insulation is required, the tape is preferably a fabric of asbestos, paper or cloth. In such use of the invention where unusual bending is required or where additional strength is desirable, a tape of metal such as strip brass is preferred. In pipes subjected to unusually severe vibration or bending, the various layers of insulating material are best preserved in their most effective insulating position by the use of metal tape. In the use of thin walled tubes of great flexibility, it is frequently necessary to employ a tightly wound metal tape to increase the tensile strength of the unit. In such instances relatively high pressures may be employed in thin flexible tubes.

The order in which the insulating layers and the tape are applied may be reversed from that shown. The woven fabric may be placed over the pipe and the tape applied over the fabric and subsequent layers of tape and insulation applied thereon. The tape may be used as a supporting outside covering over single or multiple layers of insulating material. A tape of metal may be tightly wound in helical, telescopic manner around relatively thin walled tubes to increase the tensile strength of the tube and at the same time permit a high degree of flexibility.

I claim

1. In an insulated tubular member, the combination comprising a metal pipe, a layer of flexible insulating material over the pipe, and a helically wound metal tape forming a telescopic supporting and protecting covering over said layer of insulating material.

2. An insulated conduit comprising a metal tube, a cord of insulating material wound in uniformly spaced successive turns around the tube, and a tape helically wound in overlapped relation to form a telescopic supporting layer over the cord, said tube, cord and tape co-operating to form a flexible unit.

3. In a flexible conduit for conveying fluids under pressure, the combination comprising a flexible metal tube and a metal tape tightly wound in helical overlapped relation to form a telescopic supporting covering over said tube, whereby the tensile strength of the tube is augmented and flexibility not materially diminished.

4. A flexible insulated conduit, comprising a flexible metal pipe, a layer of underlying, insulating cord wound helically around the pipe in spaced relationship to provide air spaces between adjacent turns of the cord, a second layer of overlying, insulating cord wound helically over the first layer of cord in spaced relationship to provide additional air spaces between adjacent turns of the cord, a layer of flexing material interposed between the two layers of cord to maintain the spacing of the turns of both cords when the pipe is subjected to bending and to prevent the turns of overlying cord from falling into the air spaces of the underlying cord.

5. A flexible insulated conduit comprising a flexible metal pipe, insulating material applied to the pipe to provide air spaces between portions of the material, a second layer of insulating material over the first named insulation, a layer of material interposed between the two layers of insulating material adaptable to serve as a bearing to permit sliding motion between the layers when the pipe is flexed.

6. A flexible insulated conduit, comprising a flexible metal pipe, a layer of underlying, insulating, woven fabric wound around the pipe, said woven fabric being provided with air spaces, a second layer of overlying, insulating, woven fabric provided over the first layer of woven fabric, said second layer of woven fabric also being provided with air spaces, and a layer of flexing material interposed between the two layers of woven fabric.

PAUL B. ANDREWS.